Figure 5:
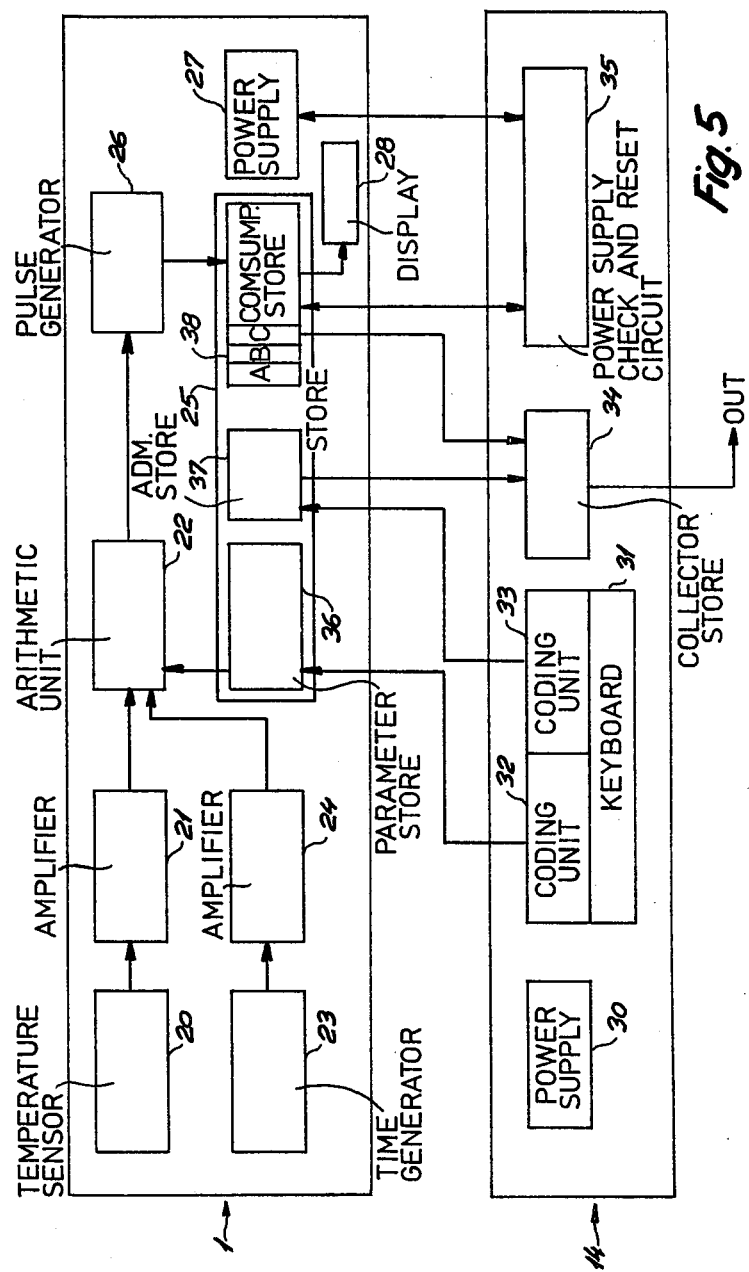

United States Patent [19]

Dobronyi et al.

[11] Patent Number: 4,473,307
[45] Date of Patent: Sep. 25, 1984

[54] HEAT METER SYSTEM INCLUDING MEANS FOR SEPARATE, AUTOMATIC REGISTRATION OF HEAT CONSUMPTION

[75] Inventors: Istvan P. Dobronyi, Ballerup; Egon C. Larsen, Valby, both of Denmark

[73] Assignee: ISS Clorius International a.s., Denmark

[21] Appl. No.: 387,847

[22] PCT Filed: Oct. 15, 1981

[86] PCT No.: PCT/DK81/00089
§ 371 Date: Jun. 3, 1982
§ 102(e) Date: Jun. 3, 1982

[87] PCT Pub. No.: WO82/01589
PCT Pub. Date: May 13, 1982

[30] Foreign Application Priority Data
Oct. 16, 1980 [DK] Denmark .............................. 4377/80

[51] Int. Cl.³ .......................... G01K 17/06; G06F 7/38
[52] U.S. Cl. ...................................... 374/39; 364/400; 364/557; 374/186; 377/25
[58] Field of Search ............... 374/100, 170, 166, 163, 374/39, 186, 41; 73/861.03; 377/13, 14, 25, 19, 29; 364/557, 505

[56] References Cited

U.S. PATENT DOCUMENTS

| 3,979,952 | 9/1976 | Bornstein et al. | 374/39 |
| 4,122,719 | 10/1978 | Carlson et al. | 364/557 X |
| 4,298,947 | 11/1981 | Tamura et al. | 377/29 X |
| 4,316,256 | 2/1982 | Hendricks et al. | 364/557 X |
| 4,324,138 | 4/1982 | Davis et al. | 374/170 X |
| 4,345,132 | 8/1982 | Takase et al. | 364/400 X |
| 4,377,948 | 3/1980 | Tenny, Jr. | 73/861.03 |

FOREIGN PATENT DOCUMENTS

| 2363489 | 7/1975 | Fed. Rep. of Germany . |
| 2722485 | 11/1978 | Fed. Rep. of Germany . |
| 2809165 | 9/1979 | Fed. Rep. of Germany ........ 374/39 |
| 2908669 | 9/1979 | Fed. Rep. of Germany . |
| 2912522 | 10/1980 | Fed. Rep. of Germany . |
| 2925119 | 1/1981 | Fed. Rep. of Germany . |
| 3024620 | 1/1981 | Fed. Rep. of Germany . |

*Primary Examiner*—Daniel M. Yasich
*Attorney, Agent, or Firm*—Lewis H. Eslinger

[57] ABSTRACT

A heat meter (1) for registration of heat consumption on the basis of a temperature measured is provided which with a view to obtaining direct recording and/or display of the consumption is arranged as a unit which at least comprises temperature measuring means (20, 21), a time generator (23), an arithmetic unit (22) and a programmable store (25) which is adapted to store at least the registered heat consumption. The arithmetic unit (22) is adapted to receive information from said parts sufficient for it to compute a direct index of the heat consumption, e.g. stated in kWh. A system for separate registration of the heat consumption of a plurality of heat emitting elements, such as radiators, for automatic, specified calculation of the total heat consumption of several heat emitting elements comprises a heat meter (1) of the above-mentioned type mounted in connection with each of the heat emitting elements and comprises a portable data accumulator (14), which is adapted to be temporarily connected to these heat meters (1) in succession to transmit the heat consumption recorded in each heat meter (1) to a store (34) in the data accumulator (14). The data accumulator (14) also comprises coding means (31, 32, 33) to read data into the store (25) of a heat meter (1).

3 Claims, 7 Drawing Figures

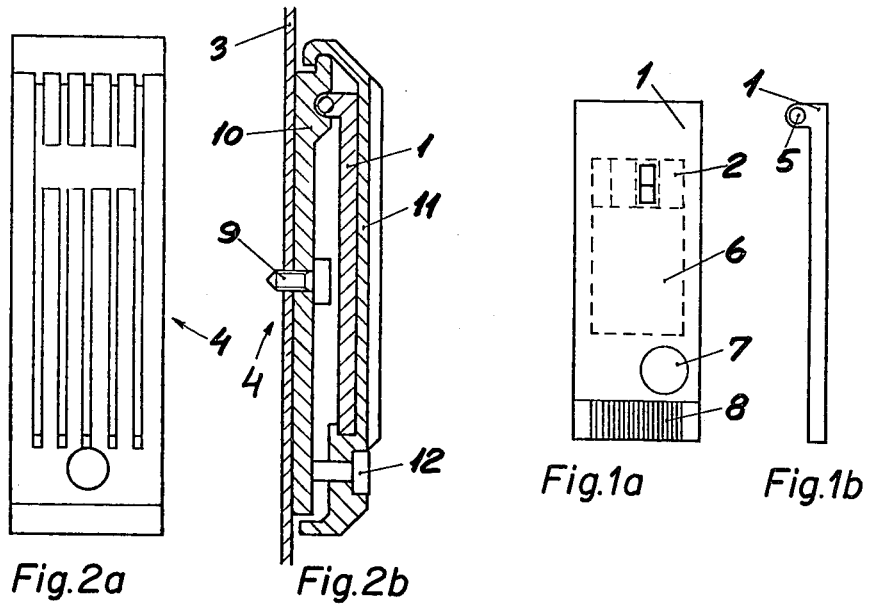
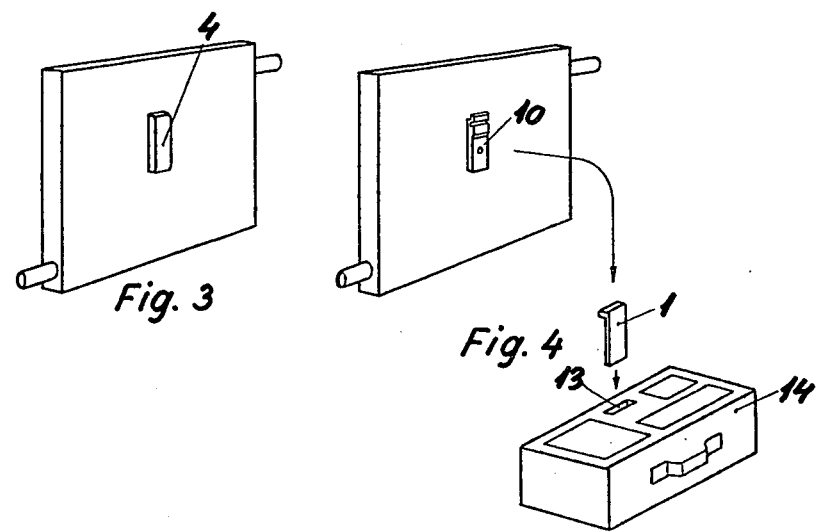

HEAT METER SYSTEM INCLUDING MEANS FOR SEPARATE, AUTOMATIC REGISTRATION OF HEAT CONSUMPTION

The invention relates to a heat consumption registration system having a temperature sensing system of the type that is adapted to be mounted in connection with a heat emitting element and which at least comprises a power supply, temperature detector means and an amplifier to generate an electric signal which is proportional to the system temperatures of the element.

Such heat consumption registration system can typically be used in apartment buildings having a number of dwellings where the individual dwelling is heated by one or more radiators supplied with heat from a district or main heating plant or a central boiler unit. Each radiator will be provided with a temperature sensing system capable of registering the heat consumption, which forms the basis of the calculation of the heat bill chargeable on each dwelling.

Until now heat distribution meters of the evaporator type have been most used, and it is a relatively new thing to construct a heat distribution meter as a purely electric means, as is known from the German Offenlegungsschrift No. 2363489. The latter prior art comprises an electric temperature sensor or transducer mounted on each radiator, the output signal from each temperature sensor being transmitted to a central location through an extensive transmission network. The central location includes electric circuits which are adapted to calculate the heat consumption of each dwelling. However, the heat consumption calculated by this prior art is not specified, and e.g. it cannot be ascertained which radiator of the dwelling has had the largest consumption. With the increasing heating costs it is very important to a heat consumer to know how the heat consumption is distributed on the individual radiators to enable him to decide whether and where he should invest in energy saving measures.

The object of the invention is to provide a heat consumption registration system of the type mentioned which specifies the heat consumption of each radiator and which is not vitiated by the known drawbacks of evaporator meters, such as reading errors and the subsequent conversion of a read value to heat consumption which cannot be made by the individual consumer himself.

This object is achieved in that the inventive temperature sensing system is involves integration of the measured heat consumption, which is currently updated by means of the computator circuit which is dependent upon the temperature measured and the parameters with respect to the heat emission capacity of the element which are contained in the data store. Since the data store is programmable, a universal temperature sensing system can be manufactured which upon mounting on a given heat emitting element can be programmed in accordance with the physical characteristics of that particular heat emitting element. The readout means mentioned may comprise a digit display for the visual display of the heat consumption.

The inventive temperature sensing system employs a dead zone or sensitively control band so that registration of heat consumption, e.g. caused by incident sunlight, can be avoided. Preferably, the data store includes a plurality of store cells or memory locations for recording the heat consumption in predetermined periods. For example, 12 store cells might be provided to record the consumption of their respective months, recording being only effected in the months comprised by a heating season.

Another object of the invention is to provide a system for separate registration of the heat consumption from a plurality of heat emitting elements with a view to automatic, specified calculation of the total heat consumption of several heat emitting elements, e.g. in a dwelling.

This object is achieved by the inventive system by providing a portable data accumulator having a memory and input/output coupling system to read out stored data to a printer or the like. The heat meter must be adapted to be able to cooperate with the data accumulator to provide for transmission of information from a large number of heat meters to the accumulator, whose store contents can subsequently be recorded by a general data system which can automatically make out a specified invoice of the heat consumption on the basis of the information received. The latter information typically includes the number of a heat emitting element, its measured heat consumption and information about the user's name and address, which are stored in the data store of the heat meter.

In one embodiment of the system the data accumulator can also be used for reading data into the heat meter, and this input may comprise resetting of the store cell which contains the accumulated heat consumption, or is used in connection with e.g. change of owners or changes in the heat emitting capacity of the respective element. In connection with the provision for selective data transport between the heat meter and the data accumulator, it is moreover advantageous to provide means for protecting certain store cells.

The interconnection of the temperature sensing system and the data accumulator can e.g. be performed in that at least a part of the temperature sensing system, which contains its data store, is removable from the heat emitting element, for example, from the radiator while the data accumulator is adapted to receive this removable part while providing a connection for transmission of data. When the meter is to be read, this can be done by briefly applying the removable part of a plurality of heat meters and successively introducing them in the data accumulator, to thereby provide for a rapid and human error-proof reading.

The invention will be explained more fully by the following description of an embodiment with reference to the drawing, in which FIG. 1 is a front and side view of an embodiment of the temperature sensing system of the invention, FIG. 2 is a front and sectional view of the temperature sensing system of FIG. 1 mounted in a holder on a heat emitting element such as a radiator, FIG. 3 shows a radiator provided with the parts shown in FIGS. 1 and 2, FIG. 4 shows the same as FIG. 3, but with the temperature sensing system temporarily removed from the holder for cooperation with a portable data accumulator, while FIG. 5 schematically shows a block diagram of the inventive temperature sensing system operatively connected to a data accumulator.

The embodiment shown in FIG. 1 of the invention comprises a portable temperature sensing system (1), a digit display (2), a temperature sensitive means or transducer (5), such as a thermistor, electronic circuits (6) which will be explained in detail hereinbelow, driven by a source of energy (7) in the form of a battery or accumulator, and electric connector terminals (8), which together with the above-mentioned components will be described later.

The temperature sensing system (1) shown in FIG. 1 may be adapted to be fitted in a holder, which is shown partly from the front and partly in section in FIG. 2. The holder comprises a rear thermal conductive plate (10) and a front plate (11), which may be locked to the rear plate (10) e.g. by means of a seal (12), so that only an authorized person has direct access to the temperature sensing system (1). The entire assembly (4) shown in FIG. 2 is mounted on a carrier plate (3) by means of a screw (9); the carrier plate (3) may either be the actual heat emitting element, e.g. in the form of a radiator, or it may be a wall near the radiator. In the second case, the temperature sensitive transducer, for example, a thermocouple (5, FIG. 1) is adapted to be mounted directly on the radiator and electrically connected to the temperature sensing system (1). FIG. 3 shows the entire assembly (4) mounted on a radiator.

It is schematically indicated in FIG. 4 how provision is made for reading of the temperature sensing system of the invention. An authorized person breaks the seal (12, FIG. 2) and removes the front plate (11), and then the temperature sensing system (1) can be taken out and introduced into a slot (13) in a data accumulator (14) according to the invention. The slot (13) contains electric connector plugs which are complementary to the connector terminals (8, FIG. 1) so that electric connection can be established between the temperature sensing system (1) and the data accumulator (14). Thus, data can be briefly exchanged between the temperature sensing system (1) and the data accumulator (14), as explained in greater detail below, and subsequently the temperature sensing system (1) is repositioned in the holder, which is then sealed.

For a more detailed explanation of the operation of the temperature sensing system and data accumulator of the invention reference is made to the FIG. 5, which shows a schematic block diagram of these parts. The blocks shown in the figure represent circuits which are known per se and will accordingly not be described in detail since a skilled person will be able to readily provide the functions described below by means of commercially available circuit components.

The temperature sensing system (1) contains a temperature sensor (20), which may be a temperature dependent resistor/transistor which corresponds to the temperature sensing means (5) of FIG. 1, and which connected to an amplifier (21) applies an output signal to an arithmetic unit (22). Alternatively, the temperature sensor (20) and the amplifier (21) may be connected in a bridge coupling, and the amplifier (21) can be arranged, in a manner known per se, to exhibit a dead zone or nonoperable band, so that no output signal is generated if the temperature sensor (20) detects a temperature below e.g. 23° C. This ensures that the temperature sensing system does not erroneously detect or register a heat consumption, e.g. if an excess temperature of 22° C. is brought about by e.g. incident sunlight or by a fireplace, etc.

The arithmetic unit (22) is moreover adapted to receive a timing pulse signal from a time generator (23) and an associated amplifier (24) and to receive information from a store or memory generally designated by 25. The latter information may contain information about e.g. the heat transfer capacity and position of the radiator as well as other quantities which are important to the calculation of the heat consumption on the basis of the temperature measured by the temperature sensor (20). The arithmetic unit (22) is adapted to combine these signals to provide a signal which represents the heat consumption of the associated radiator and is used for the control of a pulse generator (26), which is adapted to integrate the consumption by updating one or more registers in the store (25) to generate an index of heat consumption. Moreover, the temperature sensing system contains a power supply (27), and a digit display (28) for the visual display of a value recorded in a store cell. In the event that the contents of several different store cells are to be read out, the meter (1, FIG. 1) may be provided with push-buttons (not shown) for selection of the display of information. In addition to the selective display of information about the heat consumption in some preceding, individual months, it is e.g. also conceivable that the digit display (28) shows the time in dependence upon a quartz controlled time generator (23).

The data accumulator of the invention, in the embodiment shown in FIG. 5, comprises a power supply (30), a keyboard (31) and associated coding units (32, 33), a data collector store (34) and a circuit (35) for controlling and resetting a temperature sensing system. The part of the store (25) in the heat meter which contains parameters for the heat emission capacity of a given radiator may be provided with information corresponding to the heat emission capacity when the temperature sensing system is manufactured, but it is preferred, as shown in FIG. 5, that a parameter store (36) can receive information from the coding unit (32). In case of a newly installed temperature sensing system each heat meter in cooperation with the data accumulator as shown in FIG. 4 can be supplied with exactly those parameters which correspond to the radiator on which the temperature sensing system is mounted after the parameters have been read in. With a view to the subsequent recording of the heat consumption each temperature sensing system must also contain administrative information about the consumer's address, name, optionally the radiator number, etc., and this information, too, can be read into an administrative store (37) by means of the keyboard (31) via the coding unit (33). In addition to the mentioned possibilities of coding by means of the keyboard (31) of the data accumulator, it is also possible to read in information about a limit temperature below which no consumption is to be registered, or information specifying a period of time for the registration of heat consumption, e.g. from September to May. This significantly reduces the power consumption of the temperature sensing system and prolongs battery life.

The heat consumption is regularly registered, e.g. once a year where an authorized person successively performs the operation explained in connection with FIG. 4 for all temperature sensing system in e.g. a block of dwellings or apartment buildings. When a temperature sensing system (1) is mounted in a data collector as explained in connection with FIG. 4, in addition to the data communication connections mentioned above, further connections are established between both the administrative store (37) and a consumption store (38) and the data collector store (34). Thus, information is transmitted to the data collector store about the consumer data (name, address, etc.) associated with the respective radiator, and information about the heat consumption, e.g. in kWh. Accordingly, the data collector store (34) contains a human error-proof recording of the heat consumption from each individual radiator in the block of dwellings or apartment buildings, and when the portable data accumulator is connected to a central data system, the latter can automatically make out specified invoices for each dwelling. The invoice may specify the heat consumption of each individual radiator in a dwelling, but it may also specify the distribution of the heat consumption on each individual month in the heating season because the consumption store (38) may comprise a plurality of registers (indicated by A, B, C in the figure) which are adapted to contain information about the heat consumption in the respective months of the year. The latter registers may be reset by means of the control circuit (35) simultaneously with a reading of the registered heat consumption, but it is also conceivable that the consumption store (38) can contain so many registers that last year's heat consumption in the individual months can be stored and read out on the display (28) for comparison with the corresponding heat consumption in the following heating season.

We claim:

1. A system for separate registration of the heat consumption of a plurality of heat emitting elements, such as heat radiators, comprising a corresponding plurality of temperature sensing systems one provided for each of said heat emitting elements, said temperature sensing system including a battery, temperature detector means in thermal contact with each of said heat emitting elements, and an amplifier connected to generate an electric signal proportional to the temperature of said element detected by each of said temperature detector means, a timing generator, a data store, and a computation circuit responsive to the temperature detected by said temperature detector means, wherein the timing generator and the data store cooperate to generate an index of the heat emission of the corresponding heating element, and wherein the data store is programmable; and further comprising a portable data accumulator having a registration store and a coupling means adapted to be releasably and electrically connected to a selected one of said temperature sensing systems to transmit data from the data store of the temperature sensing system to the registration store and to transmit data from the data accumulator to the data store of the temperature sensing system.

2. A heat meter according to claim 1, characterized in that the temperature detector means (20, 21) have a dead zone and are adapted to register measurements only above a predetermined temperature.

3. A heat meter according to claim 1 or 2, characterized in that the data store (25) comprises a plurality of memory or store cells (A,B,C) which are adapted to contain heat consumption data for respective, predetermined periods of time.

* * * * *